United States Patent
Yoshida (10) Patent No.: US 12,110,432 B2
(45) Date of Patent: *Oct. 8, 2024

(54) METHOD FOR PRODUCING FLUORIDE FLUORESCENT MATERIAL

(71) Applicant: NICHIA CORPORATION, Anan (JP)

(72) Inventor: Tomokazu Yoshida, Anan (JP)

(73) Assignee: NICHIA CORPORATION, Anan (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/149,244

(22) Filed: Jan. 3, 2023

(65) Prior Publication Data
US 2023/0142024 A1 May 11, 2023

Related U.S. Application Data (63) Continuation of application No. 16/719,051, filed on Dec. 18, 2019, now Pat. No. 11,572,506.

(30) Foreign Application Priority Data

Dec. 20, 2018 (JP) .................. 2018-238754

(51) Int. Cl.
C09K 11/61 (2006.01)
C01B 33/10 (2006.01)

(52) U.S. Cl.
CPC .......... *C09K 11/617* (2013.01); *C01B 33/103* (2013.01); *C01P 2006/60* (2013.01)

(58) Field of Classification Search
CPC ................................................. C09K 11/617
See application file for complete search history.

(56) References Cited

U.S. PATENT DOCUMENTS 8,906,724 B2 12/2014 Murphy et al.
8,974,696 B2 3/2015 Kaneyoshi et al.
(Continued)

FOREIGN PATENT DOCUMENTS

JP 2012224536 A 11/2012
JP 2016517464 A 6/2016
(Continued)

OTHER PUBLICATIONS

Libretexts. 11.20: Substances which are both oxidizing and reducing agents. Retrieved from: https://chem.libretexts.org/Bookshelves/General_Chemistry/ChemPRIME_(Moore_et_al.)/11%3A_Reactions_in_Aqueous_Solutions/11.20%3A_Substances_Which_Are_Both_Oxidizing_and_Reducing_Agents on Dec. 1, 2023 (Year: 2023).*
(Continued)

*Primary Examiner* — Matthew E. Hoban
(74) *Attorney, Agent, or Firm* — Hunton Andrews Kurth LLP (57) ABSTRACT

A method for producing a fluoride fluorescent material comprises: preparing fluoride particles having a composition containing at least one element or ion A selected from the group consisting of alkaline metal elements and $NH_4^+$, at least one element M selected from the group consisting of Group-4 elements and Group-14 elements, $Mn^{4+}$, and F, in which a molar ratio of A in 1 mol of the composition is 2, a total molar ratio of M and $Mn^{4+}$ is 1, a molar ratio of $Mn^{4+}$ is in a range of more than 0 and less than 0.2, and a molar ratio of F is 6; subjecting the fluoride particles to a first heat treatment at a temperature of 500° C. or more in an inert gas atmosphere; washing the first heat-treated fluoride particles with a washing liquid; and bringing the washed fluoride particles into contact with a fluorine-containing substance and subjecting the resulting fluoride particles to a second heat treatment at a temperature of 400° C. or more.

13 Claims, 2 Drawing Sheets

(56) References Cited

U.S. PATENT DOCUMENTS

| | | | |
|---|---|---|---|
| 9,399,732 B2 | 7/2016 | Murphy | |
| 9,698,314 B2 | 7/2017 | Murphy et al. | |
| 2012/0256125 A1 | 10/2012 | Kaneyoshi et al. | |
| 2014/0264418 A1 | 9/2014 | Murphy et al. | |
| 2014/0327026 A1 | 11/2014 | Murphy et al. | |
| 2015/0054400 A1 | 2/2015 | Murphy | |
| 2016/0115382 A1* | 4/2016 | Du | H01L 33/00 |
| | | | 252/301.4 F |
| 2018/0265780 A1* | 9/2018 | Kim | H05B 33/14 |
| 2019/0062630 A1* | 2/2019 | Mitani | C09K 11/617 |

FOREIGN PATENT DOCUMENTS

| | | | |
|---|---|---|---|
| JP | 2016534199 A | 11/2016 | |
| JP | 2016204432 A | 12/2016 | |
| JP | 2017149862 A | 8/2017 | |
| JP | 2017537999 A | 12/2017 | |
| JP | 2018012814 A | 1/2018 | |

OTHER PUBLICATIONS

Sijbom. K2SiF6:Mn4+ as a red phosphor for displays and warm-white LEDs: a review of properties and perspectives. Optical Materials Express vol. 7, No. Sep. 9, 2017. p. 3332-3365 (Year: 2017).*

Sijbom et al., "K2SiFs:Mn4+ as a red phosphor for displays and warm-white LEDs: a review of properties and perspectives," vol. 7, No. 9, Sep. 1, 2017, Optical Materials Express 3332 (Year: 2017).

* cited by examiner

METHOD FOR PRODUCING FLUORIDE FLUORESCENT MATERIAL

CROSS-REFERENCE TO RELATED PATENT APPLICATION

This is a continuation application of U.S. patent application Ser. No. 16/719,051, filed Dec. 18, 2019, which claims priority to Japanese Patent Application No. 2018-238754, filed on Dec. 20, 2018, the disclosure of which is hereby incorporated reference in its entirety.

BACKGROUND

Technical Field

The present disclosure relates to a method for producing a fluoride fluorescent material. In this specification, the "fluorescent material" is used in the same meaning as a "fluorescent phosphor".

Description of Related Art

Various light emitting devices that emit white light, bulb color light, orange light by a combination of a light emitting element and a fluorescent material have been developed. The light emitting device of this type emits while-based mixed-color light by mixing red light, green light, and blue light, which are three primary colors of light, through combination of, for example, a light emitting device that emits light on the short wavelength side corresponding to ultraviolet light to visible light, and fluorescent materials that emit red, green, and blue light. Such a light emitting device is being used in a wide variety of fields including general illuminations, in-vehicle lightings, displays, backlights for liquid crystal devices. For example, the fluorescent material that is used in a light emitting device for the purpose of a backlight for a liquid crystal display device is demanded to have good color purity, that is, a narrow full width at half maximum of the light emission peak in order to reproduce a wide range of colors on the chromaticity coordinates. The full width at half maximum refers to a full width at half maximum (FWHM) of the light emission peak in the light emission spectrum, and means a wavelength width of the light emission peak at 50% of the maximum value of the light emission peak in the light emission spectrum.

In particular, as the fluorescent material that emits red light having a narrow full width at half maximum of the light emission peak, for example, Japanese Unexamined Patent Publication No. 2012-224536 discloses a fluoride fluorescent material having a composition represented by $K_2SiF_6:Mn^{4+}$.

The fluorescent material used in the light emitting device is being required to have a narrow full width at half maximum of the light emission peak, and to improve the durability. For example, the fluoride fluorescent material disclosed in Japanese Unexamined Patent Publication No. 2012-224536 has room for improvement in durability.

Thus, the present disclosure has an object to provide a method for producing a fluoride fluorescent material having improved durability.

SUMMARY

The present disclosure includes the following embodiment.

A first embodiment of the present disclosure is a method for producing a fluoride fluorescent material including:

subjecting the fluoride particles to a first heat treatment at a temperature of 500° C. or more in an inert gas atmosphere, wherein the fluoride particles has a composition containing at least one element or ion A selected from the group consisting of alkaline metal elements and $NH_4^+$, at least one element M selected from the group consisting of Group-4 elements and Group-14 elements, $Mn^{4+}$, and F, in which a molar ratio of A in 1 mol of the composition is 2, a total molar ratio of M and $Mn^{4+}$ is 1, a molar ratio of $Mn^{4+}$ is in a range of more than 0 and less than 0.2, and a molar ratio of F is 6, to obtain first heat-treated fluoride particles;

washing the first heat-treated fluoride particles with a washing liquid to obtain washed fluoride particles; and bringing the washed fluoride particles into contact with a fluorine-containing substance and subjecting the resulting fluoride particles to a second heat treatment at a temperature of 400° C. or more.

In accordance with the above embodiment, a fluoride fluorescent material having improved durability may be provided.

DETAILED DESCRIPTION

The method for producing a fluoride fluorescent material according to the present disclosure will be hereunder described on the basis of embodiments. The embodiments described below are exemplifications for embodying the technical idea of the present disclosure, and the present disclosure is not limited to the following method for producing a fluoride fluorescent material. Standards according to Japanese Industrial Standard (JIS) Z8110 are applied to the relations between color names and chromaticity coordinates, the relations between wavelength ranges of light and color names of monochromatic lights.

Method for Producing Fluoride Fluorescent Material

Figure 1:
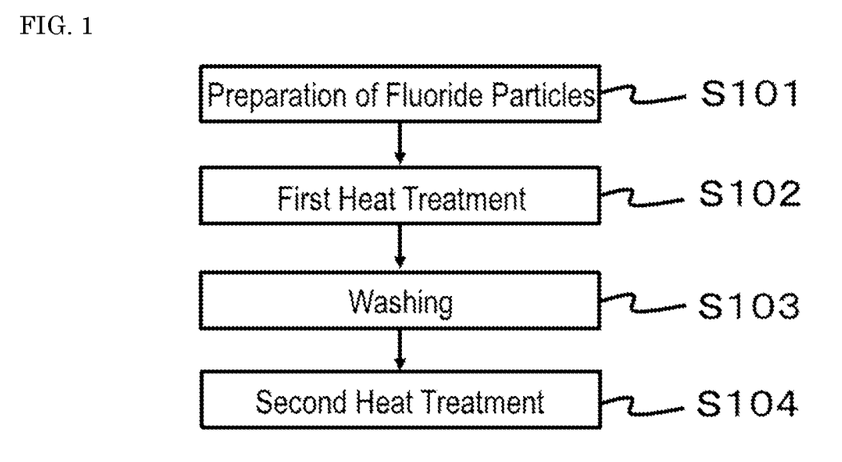
FIG. 1 is a flowchart describing an order of steps in a method for producing a fluoride fluorescent material according to an embodiment of the present disclosure.

FIG. 1 is a flowchart describing an example of steps in the method for producing a fluoride fluorescent material according to the present disclosure. The method for producing a fluoride fluorescent material includes subjecting fluoride particles to a first heat treatment (S102), washing (S103), and a second heat treatment (S104) in this order. The method for producing a fluoride fluorescent material preferably includes preparing fluoride particles (S101) to be a fluoride fluorescent material prior to the first heat treatment.

The method for producing a fluoride fluorescent material may include: subjecting fluoride particles having a composition containing at least one element or ion A selected from the group consisting of alkaline metal elements and $NH_4^+$, at least one element M selected from the group consisting of Group-4 elements and Group-14 elements, $Mn^{4+}$, and F, in which a molar ratio of A in 1 mol of the composition is 2, a total molar ratio of M and $Mn^{4+}$ is 1, a molar ratio of $Mn^{4+}$ is in a range of more than 0 and less than 0.2, and a molar ratio of F is 6, to a first heat treatment at a temperature of 500° C. or more in an inert gas atmosphere to obtain the first heat-treated fluoride particles (S102); washing the first heat-treated fluoride particles with a washing liquid to obtain washed fluoride particles (S103); and bringing the washed fluoride particles into contact with a fluorine-containing substance and subjecting the resulting fluoride particles to a second heat treatment at a temperature of 400° C. or more (S104).

The fluoride particles preferably have a composition represented by the following formula (I).

$$A_2[M_{1-a}Mn^{4+}{}_aF_6] \qquad (I)$$

wherein A represents at least one element or ion selected from the group consisting of alkaline metal elements and $NH_4^+$, M represents at least one element selected from the group consisting of Group-4 elements and Group-14 elements, and a satisfies 0<a<0.2.

The fluoride particles having a composition represented by the formula (I) (hereinafter also simply referred to as "fluoride particles") may be excited with light emitted from a light source, and may function as a fluorescent material that emits red light. The fluoride particles having a composition represented by the formula (I) may be subjected to a first heat treatment at a temperature of 500° C. or more in an inert gas atmosphere; are washed with a washing liquid; and are brought into contact with a fluorine-containing substance and subjected to a second heat treatment at a temperature of 400° C. or more, so that the durability may be improved without impairing the function as a fluorescent material.

It may be considered that by subjecting the fluoride particles to the first heat treatment, the washing, and the second heat treatment, the crystal structure near $Mn^{4+}$ that activates the fluoride fluorescent material is stabilized, or crystal defects in the fluoride fluorescent material are reduced, and thus the durability of the resulting fluoride fluorescent material is improved. More specifically, it may be considered that by subjecting the fluoride particles to a first heat treatment at a relatively high temperature of 500° C. or more in an inert gas atmosphere, the crystal structure near $Mn^{4+}$ that is an activating element is stabilized. Next, by washing the first heat-treated fluoride particles with a washing liquid, fluoride salts such as potassium fluoride generated by the first heat treatment at a relatively high temperature of 500° C. or more may be eliminated, a change in chemical composition of fluoride particles may be suppressed, and deterioration in durability due to compositional deviation may be suppressed. Then, it is presumed that by subjecting the washed fluoride particles to a second heat treatment at a temperature of 400° C. in the presence of a fluorine-containing substance, fluorine is supplied to a portion where the fluorine is insufficient by the first heat treatment at a temperature of 500° C. or more to reduce defects in the crystal structure, and thus a fluoride fluorescent material having improved durability is obtained.

Fluoride Particles

From the viewpoint of durability, the particle diameter and the particle size distribution of the fluoride particles preferably exhibit a single peak particle size distribution with few fine particles having low durability, and more preferably exhibit a single peak particle size distribution with a narrow distribution width.

The fluoride particles function as a fluorescent material activated with $Mn^{4+}$, and absorb light in the short wavelength region of visible light to emit red light. The excitation light that is the light in the short wavelength region of visible light is preferably mainly light in the blue region. Specifically, the excitation light to be irradiated to the fluoride particles preferably has a light emission peak wavelength in a range of 380 nm or more and 485 nm or less in the light emission spectrum.

The light emission spectrum of the fluoride particles preferably has a peak wavelength in a range of 610 nm or more and 650 nm or less. In addition, the numerical value of the full width at half maximum in the light emission spectrum of the fluoride particles is preferably small, specifically 10 nm or less.

In the formula (I), A is at least one element or ion (hereinafter also referred to as "A element" or "A ion") selected from the group consisting of alkaline metal elements and $NH_4^+$. In the formula (I), A is preferably at least one element or ion selected from the group consisting of K, Li, Na, Rb, Cs, and $NH_4^+$, more preferably at least one element or ion selected from the group consisting of K, Na, and $NH_4^+$, even more preferably K.

In the formula (I), M is at least one element (hereinafter also referred to as "M element") selected from the group consisting of Group-4 elements and Group-14 elements, and is preferably at least one element selected from the group consisting of Si, Ge, Sn, Ti, Zr, and Hf, more preferably at least one element selected from the group consisting of Si, Ge, Ti, and Zr, even more preferably Si.

In the formula (I), the parameter a represents a molar ratio of $Mn^{4+}$ that is an activating element in 1 mol of the chemical composition represented by the formula (I). In the formula (I), the parameter a is a number in a range of more than 0 and less than 0.2 (0<a<0.2), and is preferably a number in a range of 0.005 or more and 0.15 or less (0.005≤a≤0.15), more preferably a number in a range of 0.010 or more and 0.100 or less (0.010≤a≤0.100), even more preferably a number in a range of 0.015 or more and 0.090 or less (0.015≤a≤0.090).

Method for Producing Fluoride Particles
Preparation Fluoride Particles

The fluoride particles may be produced by a production method including a step of mixing, for example, a first solution containing at least an A ion and hydrogen fluoride, a second solution containing at least a first complex ion containing tetravalent manganese and hydrogen fluoride, and a third solution containing at least a second complex ion containing an M element and a fluorine ion. Examples of the A ion may include a potassium ion. Examples of the M element may include Si.

By mixing the first solution, the second solution, and the third solution, fluoride particles having a desired composition and functioning as a fluorescent material may be produced by a simple method excellent in productivity.

First Solution

The first solution (hereinafter also referred to as "solution 1") contains at least an A ion and hydrogen fluoride, and may contain other components as necessary. The first solution is provided, for example, as an aqueous solution of hydrofluoric acid containing an A ion. Examples of the compound containing an A element or A ion, which is contained in the first solution, may include water-soluble compounds, such as a halide, a hydrofluoride, a hydroxide, an acetate, and a carbonate, containing an A element or an A ion. When the A ion is a potassium ion, specific examples of the compound may include water-soluble potassium salts, such as KF, $KHF_2$, KOH, KCl, KBr, KI, potassium acetate, and $K_2CO_3$. Among others, $KHF_2$ is preferable because it may be dissolved without lowering the hydrogen fluoride concentration in the solution, and has a low dissolution heat and high safety. The compound containing an A element or A ion, which constitutes the first solution, may be used alone, or may be used in combination of two or more thereof.

The lower limit value of the hydrogen fluoride concentration in the first solution is generally 1% by mass or more, and preferably 3% by mass or more, more preferably 5% by mass or more. In addition, the upper limit value of the hydrogen fluoride concentration in the first solution is generally 80% by mass or less, and preferably 75% by mass or less, more preferably 70% by mass or less.

The lower limit value of the A ion concentration in the first solution is generally 1% by mass or more, and preferably 3% by mass or more, more preferably 5% by mass or more. In addition, the upper limit value of the A ion concentration in the first solution is generally 30% by mass or less, and preferably 25% by mass or less, more preferably 20% by mass or less. When the A ion concentration is 5% by mass or more, the yield of the fluoride particles tends to be improved.

Second Solution

The second solution (hereinafter also referred to as "solution 2") contains at least a first complex ion containing tetravalent manganese and hydrogen fluoride, and may contain other components as necessary. The second solution is provided, for example, as an aqueous solution of hydrofluoric acid containing a tetravalent manganese source. The manganese source is a compound containing tetravalent manganese. Specific examples of the manganese source contained in the second solution may include $K_2MnF_6$, $KMnO_4$, and $K_2MnCl_6$. Among others, $K_2MnF_6$ is preferable because it does not contain chlorine which tends to distort and destabilize the crystal lattice, and may be stably present in hydrofluoric acid as an $MnF_6$ complex ion while maintaining the oxidation number (tetravalent) that may be activated. In addition, the manganese source containing an A element or A ion may also serve as an A element or A ion source contained in the first solution. The manganese source constituting the second solution may be used alone, or may be used in combination of two or more thereof.

The lower limit value of the hydrogen fluoride concentration in the second solution is generally 1% by mass or more, and preferably 3% by mass or more, more preferably 5% by mass or more. In addition, the upper limit value of the hydrogen fluoride concentration in the second solution is generally 80% by mass or less, and preferably 75% by mass or less, more preferably 70% by mass or less.

The lower limit value of the first complex ion concentration in the second solution is generally 0.01% by mass or more, and preferably 0.03% by mass or more, more preferably 0.05% by mass or more. In addition, the upper limit value of the first complex ion concentration in the second solution is generally 5% by mass or less, and preferably 3% by mass or less, more preferably 2% by mass or less.

Third Solution

The third solution (hereinafter also referred to as "solution 3") contains at least a second complex ion containing an M element and a fluorine ion, and may contain other components as necessary. The third solution is provided, for example, as an aqueous solution containing a second complex ion source.

The second complex ion source is preferably a compound containing an M element and a fluoride ion and having excellent solubility in a solution. When the M element is Si, specific examples of the second complex ion source may include $H_2SiF_6$, $Na_2SiF_6$, $(NH_4)_2SiF_6$, $Rb_2SiF_6$, and $Cs_2SiF_6$. Among others, $H_2SiF_6$ is preferable because it has high solubility in water, and does not contain alkali metal elements as impurities. The second complex ion source constituting the third solution may be used alone, or may be used in combination of two or more thereof.

The lower limit value of the second complex ion concentration in the third solution is generally 10% by mass or more, and preferably 15% by mass or more, more preferably 20% by mass or more. In addition, the upper limit value of the second complex ion concentration in the third solution is generally 60% by mass or less, and preferably 55% by mass or less, more preferably 50% by mass or less.

As a method for mixing the first solution, the second solution, and the third solution, for example, the second solution and the third solution may be added and mixed while stirring the first solution, or the first solution and the second solution may be added and mixed while stirring the third solution. Also, the first solution, the second solution, and the third solution may be introduced into a container to be stirred and mixed.

When the first solution, the second solution, and the third solution are mixed, the first complex ion, the A ion, and the second complex ion react with each other to precipitate crystals of the desired fluoride particles. The precipitated crystals may be collected by solid-liquid separation through filtration. Also, the precipitated crystals may be washed with a solvent such as ethanol, isopropyl alcohol, water, or acetone. Further, the resulting precipitated crystals may be subjected to a drying treatment. The drying treatment is generally performed at 50° C. or more, preferably at 55° C. or more, more preferably at 60° C. or more; and generally performed at 110° C. or less, preferably at 105° C. or less, more preferably at 100° C. or less. The drying time is not particularly limited as long as the moisture attached to the fluoride particles may be eliminated, and is, for example, about 10 hours.

Here, in consideration of deviation between the charged composition of the fluorescent raw materials and the composition of the resulting fluoride particles at the time of mixing the first solution, the second solution, and the third solution, it is preferable that the mixing ratio of the first solution, the second solution, and the third solution is appropriately adjusted such that the composition of the fluoride particles as a product becomes the desired composition.

First Heat Treatment

In the first heat treatment, the fluoride particles are subjected to a heat treatment at a temperature of 500° C. or more in an inert gas atmosphere. When the temperature for heat-treating the fluoride particles is 500° C. or more in the first heat treatment, the crystal structure near $Mn^{4+}$ that is an activating element in the fluoride particles may be stabilized, and a fluoride fluorescent material having excellent durability may be obtained. In order to stabilize the crystal structure near $Mn^{4+}$ in the fluoride particles, the first heat treatment temperature is preferably 550° C. or more, more preferably 600° C. or more, even more preferably 625° C. or more, still more preferably 650° C. or more. In order to suppress the thermal decomposition of the fluoride particles, the first heat treatment temperature is preferably less than 800° C., more preferably 780° C. or less, even more preferably 770° C. or less, still more preferably 760° C. or less, particularly preferably 750° C. or less. The first heat treatment is preferably performed in a temperature range of 650° C. or more and 750° C. or less.

The first heat treatment is performed in an inert gas atmosphere. The inert gas atmosphere means, for example, an atmosphere containing argon, helium, and nitrogen as main components in the atmosphere. The main component in the atmosphere means that the gas concentration of at least one gas selected from argon, helium, and nitrogen in the atmosphere is 70% by volume or more. The inert gas preferably contains nitrogen. The nitrogen gas concentration in the inert gas atmosphere is preferably 70% by volume or more, more preferably 80% by volume or more, even more preferably 85% by volume or more, still more preferably 90% by volume or more. The inert gas atmosphere may contain oxygen as an inevitable impurity. Here, when the concentration of oxygen contained in the atmosphere is 15% by volume or less, the atmosphere may be referred to as an inert gas atmosphere. The concentration of oxygen in the inert gas atmosphere is preferably 0.3% by volume or less, more preferably 0.1% by volume or less, and even more preferably contains no oxygen in the atmosphere. When the oxygen concentration in the inert gas atmosphere in the first heat treatment is equal to or more than a predetermined value, the $Mn^{4+}$ in the fluoride particles may be oxidized.

The time for performing the first heat treatment means a retention time of the fluoride particles at the first heat treatment temperature. The retention time of the fluoride particles at the first heat treatment temperature is preferably in a range of 1 hour or more and 40 hours or less, more preferably in a range of 2 hours or more and 30 hours or less. When the retention time of the fluoride particles at the first heat treatment temperature is in a range of 1 hour or more and 40 hours or less, and when the heat treatment is performed at a temperature of 500° C. or more in an inert gas atmosphere, the crystal structure of the fluoride particles becomes more stable, so that a fluoride fluorescent material having excellent durability may be obtained.

The first heat treatment may be performed at atmospheric pressure (0.101 MPa), may be performed at a pressure in a range of more than 0.101 MPa and 1 MPa or less, or may be performed at a pressure lower than atmospheric pressure (0.101 MPa).

Washing

In order to eliminate impurities generated by the first heat treatment, the first heat-treated fluoride particles are washed with a washing liquid. Examples of the washing liquid for washing the first heat-treated fluoride particles may include ethanol, isopropyl alcohol, water, and acetone. Since the fluoride salt such as potassium fluoride has high solubility in water, as the washing liquid, it is preferable to use water, more preferably deionized water. The washing liquid preferably contains a reducing agent such as hydrogen peroxide. When the washing liquid contains a reducing agent, the fluoride particles are reduced by the reducing agent contained in the washing liquid even if the manganese serving as an activator in the fluoride particles is oxidized by the first heat treatment, and the light emission characteristics of the resulting fluoride fluorescent material may be enhanced. Further, the washed fluoride particles may be subjected to a drying treatment. The drying temperature in the drying treatment is generally 50° C. or more, preferably 55° C. or more, more preferably 60° C. or more; and generally 110° C. or less, preferably 105° C. or less, more preferably 100° C. or less. The drying time is a time during which the moisture attached to the fluoride particles by washing with the washing liquid can be evaporated, and is, for example, about 10 hours.

Second Heat Treatment

In the second heat treatment, the washed fluoride particles may be brought into contact with a fluorine-containing substance and subjected to a heat treatment at a temperature of 400° C. or more. Since fluorine is readily supplied to the fluoride particles after the first heat treatment and washing, and the light emission characteristics of the resulting fluoride fluorescent material are readily improved, the second heat treatment temperature is preferably more than 400° C., more preferably 425° C. or more, even more preferably 450° C. or more. In order to suppress the decomposition of the resulting fluoride fluorescent material, the second heat treatment is preferably performed at a temperature of 550° C. or less, and more preferably at a temperature in a range of 450° C. or more and 550° C. or less.

The temperature of the environment in which the fluoride particles are brought into contact with the fluorine-containing substance in a solid-state or a liquid-state may be from room temperature (20° C.±5° C.) to a temperature lower than the heat treatment temperature, and may be the heat treatment temperature. Specifically, the temperature may be a low temperature in a range of 20° C. or more and less than 400° C., and may be the heat treatment temperature of 400° C. or more. When the temperature of the environment in which the fluoride particles are brought into contact with the fluorine-containing substance in a solid-state at ordinary temperature is in a range of 20° C. or more and less than 400° C., the fluoride particles are brought into contact with the fluorine-containing substance and then subjected to the heat treatment at 400° C. or more.

In the case where the fluorine-containing substance is in a solid-state or a liquid-state at ordinary temperature, the fluorine-containing substance having a fluorine element amount in a range of 1% by mass or more and 20% by mass or less, relative to 100% by mass of the total amount of the fluoride particles and the fluorine-containing substance, is preferably brought into contact with the fluoride particles. When the fluoride particles are brought into contact with the fluorine-containing substance, fluorine is supplied to the portion of the fluoride particles where the fluorine is deficient by the first heat treatment and washing, so that a fluoride fluorescent material having a high light emission intensity may be obtained.

In the case where the fluorine-containing substance is a gas, the fluoride particles may be brought into contact therewith by disposing the fluoride particles in an inert gas atmosphere containing the fluorine-containing substance. Also, in the case where the fluorine-containing substance is a gas, the fluoride particles may be disposed in an inert gas atmosphere containing the fluorine-containing substance, and then subjected to the second heat treatment at 400° C. or more in the inert gas atmosphere containing the fluorine-containing substance. In the case where the fluorine-containing substance is $F_2$ (fluorine gas) and the fluoride particles are subjected to the heat treatment at 400° C. or more in an inert gas atmosphere containing $F_2$, the $F_2$ concentration in the inert gas atmosphere is preferably 3% by volume or more, more preferably 5% by volume or more; and is preferably 30% by volume or less, more preferably 25% by volume or less. When the fluorine gas concentration in the inert gas atmosphere is in a range of 3% by volume or more and 30% by volume or less, the portion of the fluoride particles where the fluorine is deficient by the first heat treatment and washing is compensated with fluorine, so that a fluoride fluorescent material having excellent durability may be obtained.

The fluorine-containing substance is preferably at least one kind selected from the group consisting of $F_2$, $CHF_3$, $CF_4$, $NH_4HF_2$, $NH_4F$, $SiF_4$, $KrF_4$, $XeF_2$, $XeF_4$, and $NF_3$ since these compounds may be readily brought into contact with the fluoride particles. The fluorine-containing substance is more preferably $F_2$ or $NH_4F$.

The retention time at the second heat treatment temperature means a time for performing the second heat treatment on the fluoride particles. The retention time at the second heat treatment temperature is preferably in a range of 1 hour or more and 40 hours or less, more preferably in a range of 2 hours or more and 30 hours or less. When the retention time at the second heat treatment temperature is in a range of 1 hour or more and 40 hours or less, fluorine may be sufficiently supplied to the fluoride particles in contact with the fluorine-containing substance after the first heat treatment and washing, and the crystal structure of the fluoride particles becomes more stable, so that a fluoride fluorescent material having excellent durability may be obtained. In order to sufficiently supply fluorine to the fluoride particles, the retention time at the second heat treatment temperature is preferably the same as the retention time at the first heat treatment temperature, or longer than the retention time at the first heat treatment temperature. In order to sufficiently supply fluorine to the fluoride particles and maintain the light emission intensity of the resulting fluoride fluorescent material, the retention time at the second heat treatment temperature is preferably one time or more of the retention time at the first heat treatment temperature.

The pressure in the second heat treatment may be atmospheric pressure (0.101 MPa), may be a pressure in a range of more than 0.101 MPa and 5 MPa or less, or may be a pressure in a range of more than 0.101 MPa and 1 MPa or less.

Light Emitting Device

The obtained fluoride fluorescent material may be used in a light emitting device. The light emitting device includes a light source having a light emission peak wavelength in a range of 380 nm or more and 485 nm or less; and the fluoride fluorescent material. The light emitting device may further include other constituent members as necessary.

Light Source

As the light source (hereinafter also referred to as "excitation light source"), a light source that emits light having a light emission peak wavelength in a range of 380 nm or more and 485 nm or less, which is a short wavelength region of visible light, can be used. The light source for exciting the fluoride fluorescent material preferably has a light emission peak wavelength in a range of 380 nm or more and 480 nm or less, more preferably in a range of 410 nm or more and 480 nm or less. As the excitation light source, a semiconductor light emitting element (hereinafter also simply referred to as "light emitting element") is preferably used. Using a semiconductor light emitting element as the excitation light source enables a high efficiency stable light emitting device that has high linearity of output relative to input and is resistant to mechanical shock to be obtained. As the semiconductor light emitting element, for example, a semiconductor light emitting element using a nitride-based semiconductor ($In_XAl_YGa_{1-X-Y}N$, $0 \leq X$, $0 \leq Y$, $X+Y \leq 1$) may be used. The full width at half maximum of the light emission peak in the light emission spectrum of the light emitting element is preferably, for example, 30 nm or less.

Fluorescent Material

Details of the fluoride fluorescent material included in the light emitting device are as described above. The fluoride fluorescent material is contained, for example, in a fluorescent member that covers the excitation light source. In the light emitting device where the excitation light source is covered with the fluorescent member containing the fluoride fluorescent material, a part of light emitted from the excitation light source is absorbed by the fluoride fluorescent material and is emitted as red light. When the excitation light source that emits light having a light emission peak wavelength in a range of 380 nm or more and 485 nm or less is used, the emitted light may be more efficiently utilized, and loss of the light emitted from the light emitting device may be reduced, so that a high-efficiency light emitting device may be provided.

The light emitting device preferably further contains a fluorescent material other than the fluoride fluorescent material in addition to the fluoride fluorescent material. The fluorescent material other than the fluoride fluorescent material may be any fluorescent material that absorbs light emitted from the light source and converts the wavelength of the light to a wavelength different from that of the fluoride fluorescent material. The fluorescent material other than the fluoride fluorescent material may also be contained in the fluorescent member, for example, in the same manner as the fluoride fluorescent material.

Examples of the fluorescent material other than the fluoride fluorescent material may include $Si_{6-z}Al_zO_zN_{8-z}$:Eu ($0<z\leq4.2$), $(Lu,Y,Gd,Lu)_3(Ga,Al)_5O_{12}$:Ce, $(Ca,Sr,Ba)_8MgSi_4O_{16}(F,Cl,Br)_2$:Eu, $(Ca,Sr,Ba)_2SiO_4$:Eu, $(Sr,Ba,Ca)Ga_2S_4$:Eu, $(Ca,Ba,Sr)_5(PO_4)_3Cl$:Eu,Mn, $3.5MgO\cdot0.5MgF_2GeO_2$:Mn, $(Ca,Sr,Ba)_2Si_5N_8$:Eu, $CaAlSiN_3$:Eu, $(Ca,Sr)AlSiN_3$:Eu, $(Sr,Ca)LiAl_3N_4$:Eu, $(Ca,Sr)_2Mg_2Li_2Si_2N_6$:Eu, and $Sr_4Al_{14}O_{25}$:Eu. In the present specification, plural elements sectioned by comma (,) in the formula representing the composition of a fluorescent material mean that at least one of these plural elements is contained in the composition. In the present specification, the part before the colon (:) in the formula representing the composition of a fluorescent material represents a host crystal, and the part after the colon (:) represents an activating element.

Figure 2:
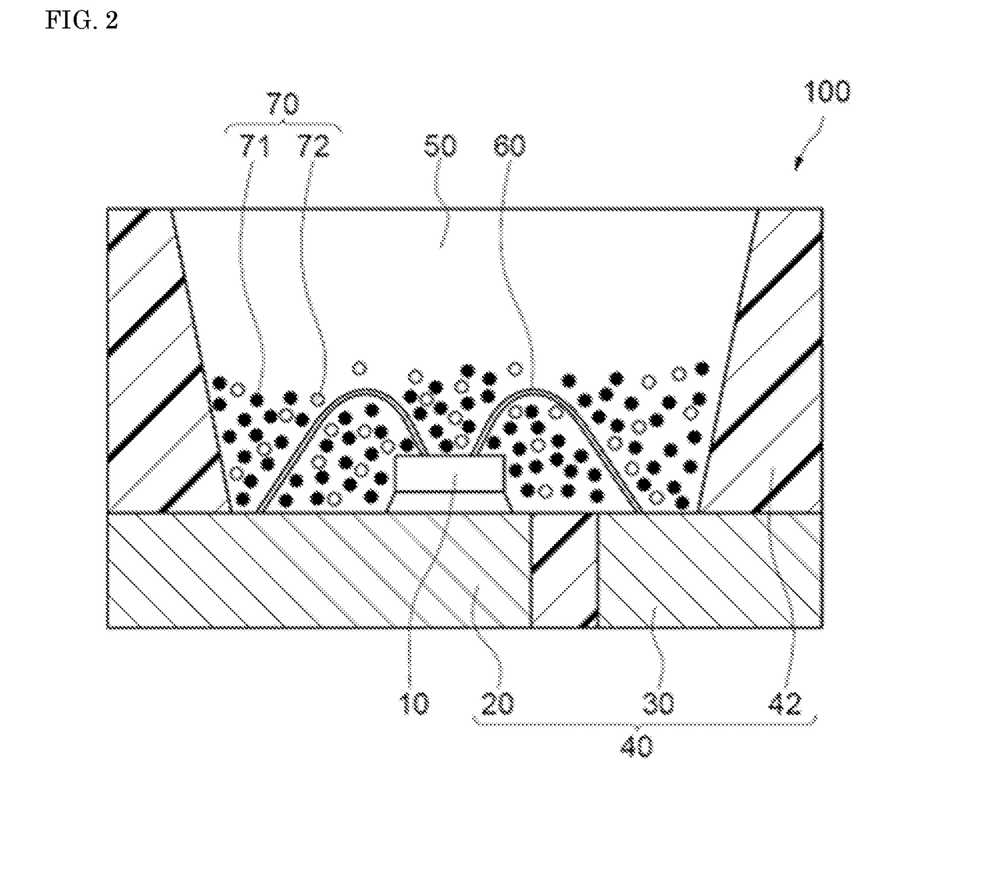
FIG. 2 is a schematic cross-sectional view showing an example of a light emitting device using a fluoride fluorescent material according to the present disclosure.

One example of the light emitting device will be hereunder described with reference to the drawing. FIG. 2 is a schematic cross-sectional view showing an example of the light emitting device according to the present disclosure. The light emitting device is an example of a surface-mounted light emitting device.

A light emitting device 100 has a light emitting element 10 that emits light having a light emission peak wavelength in a short wavelength side of visible light (for example, in a range of 380 nm or more and 485 nm or less); and a molded body 40 on which the light emitting element 10 is mounted. The molded body 40 has a first lead 20 and a second lead 30, and these are integrally molded with a thermoplastic resin or a thermosetting resin. The molded body 40 forms a recessed part having a bottom surface and side surfaces, and the light emitting element 10 is mounted on the bottom surface of the recessed part. The light emitting element 10 has a pair of positive and negative electrodes, and the pair of positive and negative electrodes each are individually electrically connected to the first lead 20 and the second lead 30 via wires 60. The light emitting element 10 is covered with a fluorescent member 50. The fluorescent member 50 comprises a fluorescent material 70 containing a fluoride fluorescent material that undergoes wavelength conversion of light emitted from the light emitting element 10. The fluorescent material 70 contains a fluoride fluorescent material as a first fluorescent material 71, and may contain a second fluorescent material 72 that emits light having a light emission peak wavelength in a wavelength range different from that of the fluoride fluorescent material by excitation light emitted from the light emitting element 10.

The fluorescent member contains a resin and a fluorescent material, and examples of the resin constituting the fluorescent member may include a silicone resin and an epoxy resin. The fluorescent member may further contain a light diffusing material in addition to the resin and the fluorescent material. By containing a light diffusing material, the directivity from the light emitting element is relaxed, and the viewing angle may be thereby enlarged. Examples of the light diffusing material may include silica, titanium oxide, zinc oxide, zirconium oxide, and alumina.

EXAMPLES

The present disclosure is hereunder specifically described by reference to the following Examples. The present disclosure is not limited to these Examples.

Production Example 1

First, a method for producing fluoride particles to be a fluoride fluorescent material will be described. $KHF_2$ was weighed in an amount of 7,029 g, and the $KHF_2$ was dissolved in 35.0 L of a 55% by mass HF aqueous solution to prepare a solution 1 (first solution). In addition, $K_2MnF_6$ was weighed in an amount of 785.4 g, and the $K_2MnF_6$ was dissolved in 12.0 L of a 55% by mass HF aqueous solution to prepare a solution 2 (second solution). Subsequently, 15.5 L of an aqueous solution containing 40% by mass of $H_2SiF_6$ was prepared to obtain a solution 3 (third solution).

Next, while stirring the solution 1 at room temperature, the solution 2 and the solution 3 were dropped thereinto for about 20 hours.

The resulting precipitate was subjected to solid-liquid separation, washed with ethanol, and dried at 90° C. for 10 hours to produce fluoride particles of Production Example 1.

Example 1

The fluoride particles produced in Production Example 1 were subjected to a first heat treatment at a temperature of 700° C. for a retention time of 5 hours in an inert gas atmosphere having a nitrogen gas concentration of 100% by volume. The first heat-treated fluoride particles were sufficiently washed with washing water containing 1% by mass of hydrogen peroxide. The washed fluoride particles were brought into contact with a fluorine gas ($F_2$) in an atmosphere having a fluorine gas concentration of 20% by volume and a nitrogen gas concentration of 80% by volume, and then subjected to a second heat treatment at a temperature of 500° C. for a retention time of 5 hours, thereby producing a fluoride fluorescent material. Here, the retention time in each of the first heat treatment and the second heat treatment refers to a time during which the fluoride particles are exposed at the first heat treatment temperature or the second heat treatment temperature after reaching the heat treatment temperature.

Example 2

A fluoride fluorescent material was produced under the same conditions as in Example 1 except that the retention time of the first heat treatment was set to 2.5 hours.

Example 3

A fluoride fluorescent material was produced under the same conditions as in Example 1 except that the retention time of the first heat treatment was set to 10 hours.

Example 4

A fluoride fluorescent material was produced under the same conditions as in Example 1 except that the retention time of the second heat treatment was set to 10 hours.

Example 5

A fluoride fluorescent material was produced under the same conditions as in Example 1 except that the retention time of the first heat treatment was set to 2.5 hours and the retention time of the second heat treatment was set to 10 hours.

Example 6

A fluoride fluorescent material was produced under the same conditions as in Example 1 except that the retention time of the first heat treatment was set to 10 hours and the retention time of the second heat treatment was set to 10 hours.

Example 7

A fluoride fluorescent material was produced under the same conditions as in Example 1 except that the temperature of the first heat treatment was set to 600° C.

Example 8

A fluoride fluorescent material was produced under the same conditions as in Example 1 except that the temperature of the first heat treatment was set to 500° C.

Comparative Example 1

The fluoride particles produced in Production Example 1 were subjected to a second heat treatment at a temperature of 500° C. for a retention time of 5 hours in an atmosphere containing a fluorine gas ($F_2$) and a nitrogen gas ($N_2$) as an inert gas and having a fluorine gas concentration of 20% by volume and a nitrogen gas concentration of 80% by volume, without performing a first heat treatment nor washing with a washing liquid, thereby producing a fluoride fluorescent material.

Comparative Example 2

A fluoride fluorescent material was produced under the same conditions as in Example 1 except that the first heat-treated fluoride particles were not washed with a washing liquid.

Evaluation

Chromaticities x, y

Using a Quantum Efficiency measurement System f (product name: QE-2000, manufactured by Otsuka Electronics Co., Ltd.), the fluoride fluorescent material obtained in each of Examples and Comparative Examples was irradiated with excitation light having a light emission peak wavelength of 450 nm, and the light emission spectrum of each fluoride fluorescent material was measured at room temperature.

The chromaticity x and chromaticity y on the xy color coordinates in the Commission international de l'eclairage (CIE) 1931 color system were determined from the light emission spectrum data of the fluoride fluorescent material in each of Examples and Comparative Examples. The results are shown in Table 1.

Mn Amount

As for the fluoride fluorescent material in each of Examples and Comparative Examples, the content of Mn was measured using an X-ray fluorescence (XRF) spectrometer (product name: ZSX Primus II, manufactured by Rigaku Corp.) according to the XRF analysis method, and the molar ratio of Mn (parameter a) in 1 mol of the composition represented by the formula (I) was determined. The results are shown in Table 1.

Durability Evaluation

A durability test was performed in such a manner that the light emitting device using the fluoride fluorescent material obtained in each of Examples and Comparative Examples continuously emitted at a current value of 150 mA under an environment of 85° C., and was evaluated after elapse of 500 hours. The chromaticity x value in the CIE 1931 color system of the light emitting device before the durability test was defined as an initial value, and the absolute value of the difference between the initial value and the x value in the CIE 1931 color system of the light emitting device after the durability test, was determined as $\Delta x$. The $\Delta x$ of the light emitting device using the fluoride fluorescent material in Comparative Example 1 was defined as a reference (100 (%)), and the $\Delta x$ of the light emitting device obtained in each of Examples and Comparative Examples was determined as a relative change rate with respect to the reference (100(%)). Here, it indicates that the lower the relative change rate (%), the smaller the change in chromaticity, meaning that the durability is excellent. The results are shown in Table 1.

TABLE 1

| | First Heat Treatment | | | Second Heat Treatment | | Fluorescent Material | | | Light Emitting Device Durability |
|---|---|---|---|---|---|---|---|---|---|
| | Temperature (° C.) | Retention Time (hr) | Washed or Not Washed | Temperature (° C.) | Retention Time (hr) | Chromaticity Coordinates x | y | Mn Amount (parameter a) | $\Delta x$ Change Rate (%) |
| Example 1 | 700 | 5 | Washed | 500 | 5 | 0.692 | 0.308 | 0.039 | 71 |
| Example 2 | 700 | 2.5 | Washed | 500 | 5 | 0.692 | 0.308 | 0.040 | 75 |
| Example 3 | 700 | 10 | Washed | 500 | 5 | 0.692 | 0.308 | 0.040 | 94 |
| Example 4 | 700 | 5 | Washed | 500 | 10 | 0.693 | 0.307 | 0.039 | 48 |
| Example 5 | 700 | 2.5 | Washed | 500 | 10 | 0.692 | 0.308 | 0.040 | 58 |
| Example 6 | 700 | 10 | Washed | 500 | 10 | 0.692 | 0.307 | 0.040 | 68 |
| Example 7 | 600 | 5 | Washed | 500 | 5 | 0.692 | 0.307 | 0.042 | 86 |
| Example 8 | 500 | 5 | Washed | 500 | 5 | 0.692 | 0.308 | 0.042 | 88 |
| Comparative Example 1 | Not performed | | Not washed | 500 | 5 | 0.693 | 0.307 | 0.043 | 100 |
| Comparative Example 2 | 700 | 5 | Not washed | 500 | 5 | 0.692 | 0.307 | 0.043 | 133 |

Production Example of Light Emitting Device

The fluoride fluorescent material obtained in each of Examples and Comparative Examples was used as a first fluorescent material 71. In addition, a β-SiAlON fluorescent material having a composition represented by $Si_{5.81}Al_{0.19}O_{0.19}N_{7.81}$:Eu and having a light emission peak wavelength of around 540 nm was used as a second fluorescent material 72. A fluorescent material 70 was obtained by blending the first fluorescent material 71 and the second fluorescent material 72 such that x was about 0.280 and y was about 0.270 on the chromaticity coordinates in the CIE 1931 color system; and the fluorescent material 70 was mixed with a silicone resin to obtain a resin composition. Next, a molded body 40 having a recessed part as shown in FIG. 2 was prepared. A light emitting element 10 made of a gallium nitride-based compound semiconductor, in which the light emission peak wavelength was 451 nm, was mounted on the surface of the recessed part, and then the electrodes of the light emitting element 10 were individually connected to a first lead 20 and a second lead with wires 60. Furthermore, the resin composition was injected in the recessed part of the molded body 40 using a syringe so as to cover the light emitting element 10, and the resin composition was cured to form a fluorescent member.

As shown in Table 1, the light emitting device using the fluoride fluorescent material in each of Examples 1 to 8 had a small change rate of $\Delta x$ before and after the durability test at a relatively high temperature of 85° C., as compared with the light emitting device using the fluoride fluorescent material in Comparative Example 1, and was excellent in durability. In the fluoride fluorescent material in each of Examples 1 to 8, the changes in chromaticity x and chromaticity y were small even when performing the first heat treatment and washing, as compared to the fluoride fluorescent material in Comparative Example 1 that was not subjected to the first heat treatment and washing. Thus, it is presumed that the composition of the fluoride particles in each of Examples 1 to 8 was maintained. The fluoride fluorescent material in Example 3 had improved durability as compared with Comparative Examples, but the change rate of $\Delta x$ was slightly larger than those of the other Examples. The reason may be considered that since the retention time of the fluoride particles at the second heat treatment temperature was shorter than the retention time of the fluoride particles at the first heat treatment temperature, the fluorine was not sufficiently supplied to the fluoride particles after the first heat treatment and washing.

As for the fluoride fluorescent material used in the light emitting device of Comparative Example 2, since the fluoride particles was not washed after the first heat treatment, the fluoride salts such as potassium fluoride generated by the first heat treatment were not eliminated. Thus, it is presumed that the composition of the resulting fluoride fluorescent material was changed from the composition of the fluoride particles. As shown in Table 1, in the light emitting device using the fluoride fluorescent material in Comparative Example 2, the change rate of Δx was larger than that of the light emitting device in Comparative Example 1, and the durability was lowered. The amount of Mn contained in the fluoride fluorescent material in each of Comparative Examples 1 and 2 was larger than those in Examples. The reason may be considered that the washing was performed in Examples, and Mn was eluted from the fluoride particles during the washing, and on the other hand, the washing was not performed in Comparative Examples, and thus the amount of Mn contained in the fluoride particles was less changed.

The fluoride fluorescent material obtained by the production method of the present disclosure may be suitably applied particularly to illumination light sources using a light emitting diode as an excitation light source, light sources for LED displays and liquid crystal backlights, traffic signals, illuminated switches, various sensors, various indicators, small-sized strobe lights.

The invention claimed is:

1. A method for producing a fluoride fluorescent material, comprising:
preparing fluoride particles by mixing a first solution containing at least an A ion selected from the group consisting of alkaline metal elements including at least K and hydrogen fluoride, a second solution containing at least a first complex ion containing tetravalent manganese and hydrogen fluoride, and a third solution containing at least a second complex ion containing an M element including at least Si and a fluorine ion;
subjecting the fluoride particles to a first heat treatment at a temperature in a range of 500° C. or more and 780° C. or less in an inert gas atmosphere;
washing the first heat-treated fluoride particles with a washing liquid including water and a reducing agent to obtain washed fluoride particles; and
bringing the washed fluoride particles into contact with a fluorine-containing substance and subjecting the resulting fluoride particles to a second heat treatment at a temperature of 450° C. or more,
wherein the A ion concentration in the first solution is in a range of 1% by mass or more and 30% by mass or less, the hydrogen fluoride concentration in the first solution is in a range of 1% by mass or more and 80% by mass or less,
the first complex ion concentration in the second solution is in a range of 0.01% by mass or more and 5% by mass or less and the hydrogen fluoride concentration in the second solution is in a range of 1% by mass or more and 80% by mass or less, and
the second complex in the third solution is in a range of 10% by mass or more and 60% by mass or less.

2. The method for producing a fluoride fluorescent material according to claim 1, wherein the inert gas comprises nitrogen.

3. The method for producing a fluoride fluorescent material according to claim 1, wherein the first heat treatment is performed at a temperature of 650° C. or more and 750° C. or less.

4. The method for producing a fluoride fluorescent material according to claim 1, wherein the washing liquid further includes at least one selected from the group of consisting of ethanol, isopropyl alcohol, and acetone.

5. The method for producing a fluoride fluorescent material according to claim 1, wherein the reducing agent contained in the washing liquid includes hydrogen peroxide.

6. The method for producing a fluoride fluorescent material according to claim 1, comprising
subjecting the washed fluoride particles to a drying treatment at a drying temperature in a range of 50° C. or more and 110° C. or less.

7. The method for producing a fluoride fluorescent material according to claim 1, wherein the fluorine-containing substance is at least one kind selected from the group consisting of $F_2$, $CHF_3$, $CF_4$, $NH_4HF_2$, $NH_4F$, $SiF_4$, $KrF_2$, $XeF_2$, $XeF_4$, and $NF_3$.

8. The method for producing a fluoride fluorescent material according to claim 1, wherein the second heat treatment is performed at a temperature of 450° ° C. or more and 550° C. or less.

9. The method for producing a fluoride fluorescent material according to claim 1, wherein the retention time at the second heat treatment temperature is one time or more of the retention time at the first heat treatment temperature.

10. The method for producing a fluoride fluorescent material according to claim 1, wherein the first heat treatment temperature is higher than the second heat treatment temperature.

11. The method for producing a fluoride fluorescent material according to claim 1, wherein the retention time at the first heat treatment temperature or the retention time at the second heat treatment temperature is in a range of 1 hour or more and 40 hours or less, the retention time at the second heat treatment temperature is longer than the retention time at the first heat treatment temperature.

12. The method for producing a fluoride fluorescent material according to claim 1, wherein the retention time at the first heat treatment temperature or the retention time at the second heat treatment temperature is in a range of 2 hour or more and 30 hours or less, the retention time at the second heat treatment temperature is longer than the retention time at the first heat treatment temperature.

13. The method for producing a fluoride fluorescent material according to claim 1, wherein the washing liquid contains 1% by mass of hydrogen peroxide.

* * * * *